UNITED STATES PATENT OFFICE.

RICHARD ZSIGMONDY, OF JENA, GERMANY.

COMPOSITION FOR RUBY GLASS.

SPECIFICATION forming part of Letters Patent No. 703,512, dated July 1, 1902.

Application filed December 26, 1901. Serial No. 87,369. (No specimens.)

*To all whom it may concern:*

Be it known that I, RICHARD ZSIGMONDY, doctor of philosophy, a subject of the Emperor of Austria-Hungary, residing at 1 Blumenstrasse, Jena, in the Grand Duchy of Saxe-Weimar, German Empire, have invented a new and useful Composition for Ruby Glass, of which the following is a specification.

The requirements of producing a ruby glass adapted for pressed and blown glasswares are rather great. The glass must be sufficiently cheap, the process of coloring must take place regularly and during the work, and the color must appear in a sufficiently-pure shade. The process of coloring as well as the melting-in must be done without any by-process.

The present invention relates to a composition for ruby glass; and it consists of mixing barytiferous glass compositions with certain quantities of gold and then melting this mixture in a glass-furnace. By the use of gold and of salts of barium ruby glasses can be obtained which become colored during the work easily and completely in a brilliant shade, and the gold is made use of in such a way that its power of coloring is utilized in a most efficient measure. These glasses of baryta possess, with regard to other glasses, the just-mentioned superiorities, it being supposed that they do not contain certain impurities that influence the process of coloring in an unfavorable manner, and it is also supposed that unfavorable circumstances of firing-in the furnace on melting-in the glass do not prevent the after development of the color. Further, the proper proportion between silicic acid and gold is substantial. The experiments have shown that not less than 0.25 parts and no more than 1.7 parts of gold to ten thousand parts of silicic acid (quartzy sand) must be employed. When less than 0.25 or more than 1.7 parts of gold are employed, the glass loses the capability of becoming colored red during the work. On employing more than 1.7 parts of gold an undesirable result is caused by the precipitation of the gold. The most advantageous results are obtained with a proportion from 0.6 to 1.4 parts of gold to ten thousand parts of silicic acid.

The composition of the glass to which gold is to be added can be varied in different ways. For instance, it may be composed of silicic acid, alkalies, and baryta only, or other oxids (or oxygen-bearing compounds, as nitrates and carbonates) of bivalent metals may be added to or substituted for part of the alkalies or the baryta. A small addition of boric acid is allowed, too. However, an addition of an oxid of antimony or of manganese or of iron or of aluminium must be avoided, because such an addition in some cases prevents the development of the color. The same disadvantageous effect is produced by the addition of a noticeable quantity of lime.

Good results have been obtained with glass compositions containing, as metallic oxids, soda and baryta only. The baryta may be introduced as oxid of barium, hydrate of barium, carbonate of barium, &c. However, the nitrate is to be preferred to the other compounds.

As an example of the proportions of mixture with which by the addition of gold a pure ruby glass can be produced the following may be stated: 1.66, chemical equivalents, $SiO_2$; 0.288, chemical equivalents, $Na_2O$; 0.276, chemical equivalents, $BaO$; or 1.66, chemical equivalents, $SiO_2$; 0.41, chemical equivalents, $Na_2O$; 0.085, chemical equivalents, $BaO$.

Also mixtures lying between the above-stated proportions allow the production of a good ruby glass. With all these mixtures it is most advantageous to use from 0.9 to 0.75 parts of gold to ten thousand parts of silicic acid. The gold may be added to the other components in one of the usual forms, as a finely-divided metal or as a metallic compound—for instance, as chlorid—in a solution sufficiently diluted by water.

In order to produce according to the present invention blown articles, it will be preferable at first to cool down the glass—for instance, by blowing it into a small mold or by cooling it with water and exposing it to the cold air. Then it should be rewarmed and blown in a proper mold.

The described colored glass may also serve for the production of molded glasswares.

What I claim as my invention, and desire to secure by Letters Patent, is—

1. A composition for ruby glass consisting of a barytiferous glass composition to which from 0.25 to 1.7 parts of gold are added for every ten thousand parts of quartzy sand, substantially as described.

2. A composition for ruby glass consisting of a barytiferous glass composition which contains as substantial metallic oxids soda and baryta and to which from 0.25 to 1.7 parts of gold are added for every ten thousand parts of quartzy sand, substantially as described.

3. A composition for ruby glass consisting of a barytiferous glass composition which contains as substantial metallic oxids soda and baryta, this baryta being added as nitrate, and to which from 0.25 to 1.7 parts of gold are added for every ten thousand parts of quartzy sand, substantially as described.

In testimony whereof I have signed my name to this specification in the presence of two subscribing witnesses.

RICHARD ZSIGMONDY.

Witnesses:
PAUL RINGER,
HANS WEISS.